United States Patent Office 3,780,047
Patented Dec. 18, 1973

3,780,047
DERIVATIVES OF PYRAZOLO[3',4'-2,3]PYRIDO [4,5-e]b-BENZO-1,5-DIAZEPINES
Theodor Denzel, Nuremberg, and Hans Hoehn, Tegernheim, Germany, assignors to E. R. Squibb & Sons, Inc., Princeton, N.J.
No Drawing. Filed July 5, 1972, Ser. No. 268,995
Int. Cl. A61k 27/00; C07d 53/04
U.S. Cl. 260—296 P          12 Claims

ABSTRACT OF THE DISCLOSURE

The new pyrazolo[3',4'-2,3]pyrido[4,5-e]b-benzo-1,5-diazepines having the general formula

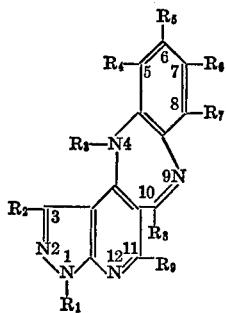

are useful as central nervous system depressants. These compounds also increase the intracellular concentration of adenosine-3',5-cyclic monophosphate.

SUMMARY OF THE INVENTION

This invention relates to new pyrazolo[3',4'-2,3]pyrido[4,5-e]b-benzo-1,5-diazepines and salts thereof. These new compounds have the formula (I)

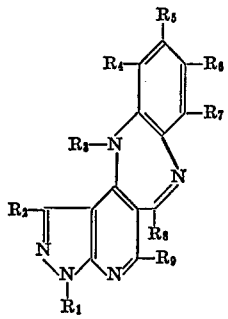

The symbols have the following meanings in Formula I and throughout this specification: $R_1$ represents hydrogen, lower alkyl, phenyl, phenyl-lower alkyl or cycloalkyl, $R_2$ represents hydrogen, lower alkyl or phenyl, $R_3$ represents hydrogen, lower alkyl, phenyl-lower alkyl, cyclo-lower alkyl or an amino-alkylene group of the formula (II)

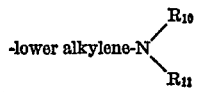

in which $R_{10}$ and $R_{11}$ each is hydrogen, lower alkyl or hydroxy-lower alkyl. In addition the nitrogen may be part of a heterocyclic of 5 or 6 members, in which an additional nitrogen, sulfur or oxygen is present, i.e., pyrrolidino, piperidino, morpholino or thiamorpholino. These heterocyclic groups may also bear a lower alkyl, lower alkoxy or hydroxy-lower alkyl group, for example, 2, 3 or 4-(lower alkoxy) piperidino, e.g., 2-methoxy piperidino, 2, 3 or 4-(lower alkyl)piperidino, e.g., 2, 3 or 4-methyl-piperidino, (lower alkyl)pyrrolidino, e.g., 2-methylpyrrolidino, (lower alkoxy)pyrrolidino, e.g., 2-ethoxypyrrolidino, (lower alkyl)morpholino, e.g., 2-methyl morpholino, or 3 - methylmorpholino, (lower alkoxy)morpholino, e.g., 2-ethoxymorpholino, (lower alkyl)thiamorpholino, e.g., 3 - methylthiamorpholino or 2-methylthiamorpholino, (lower alkoxy)thiamorpholino, e.g., 2-methoxy thiamorpholino.

$R_4$, $R_5$, $R_6$ and $R_7$ each is hydrogen, halogen, lower alkyl or lower alkoxy, $R_8$ is lower alkyl, phenyl or phenyl-lower alkyl, $R_9$ is hydrogen, lower alkyl or phenyl.

Preferred compounds of Formula I are those wherein $R_1$ is hydrogen or lower alkyl, especially ethyl, $R_2$ is hydrogen or methyl, $R_3$ is hydrogen or lower alkyl, $R_4$, $R_5$, $R_6$ and $R_7$ are hydrogen or methyl, $R_3$ is hydrogen or lower alkyl, $R_4$, $R_5$, $R_6$ and $R_7$ are hydrogen, halogen, especially chlorine, or lower alkoxy, especially methoxy, and preferably only one or two are other than hydrogen. $R_8$ is lower alkyl, especially methyl or phenyl and $R_9$ is hydrogen or lower alkyl, especially hydrogen.

DETAILED DESCRIPTION OF THE INVENTION

The various groups referred to above are of the following types: the lower alkyl and lower alkylene groups include straight or branched chain hydrocarbon groups of up to seven carbon atoms, like methyl, ethyl, propyl and the like, up to four carbon atom chains being preferred. The phenyl-lower alkyl and lower alkoxy groups contain similar radicals attached to a phenyl or oxygen, respectively. All four common halogens are contemplated but chlorine and bromine are preferred. The cyclo-lower alkyl groups are the 3 to 6 carbon alicyclics, cyclopropyl, cyclobutyl, cyclopentyl and cyclohexyl, especially the last two.

The new compounds of Formula I are formed by the following series of reactions. The symbols in the structural formulas have the same meaning as previously described.

A 5-aminopyrazole of the formula (III)

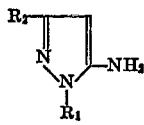

[produced analogous to the procedure described in Z.f. Chemie, 10, 386 (1970)] is made to react with an alkoxy-methylene acetic acid ester of the formula (IV)

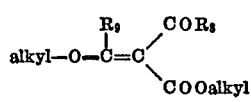

by heating at a temperature of about 120–130° C.

The resulting compound of the formula (V) 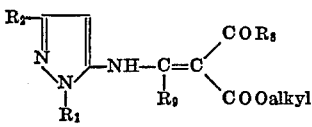

is cyclized in an inert organic solvent such as diphenyl ether at about 230° to about 260° C. while distilling off the alcohol formed, producing a compound of the formula (VI) 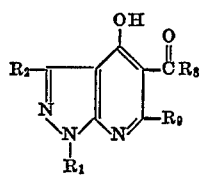

This 4-hydroxy compound is refluxed for several hours with a phosphorus halide like phosphorus oxychloride to obtain the intermediate of the formula (VII) 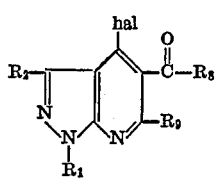

Alternatively, instead of cyclizing the compound of Formula V in an inert organic solvent at about 230 to 260° as described above, this product also undergoes cyclization by treatment with phosphorus oxychloride producing directly the intermediate of Formula VII.

This compound of Formula VII is made to react with an appropriately substituted 2-nitroaniline in the presence of a base like sodium hydride, in a high boiling solvent like dioxane or diethyleneglycol dimethylether to produce a compound of the formula (VIII) 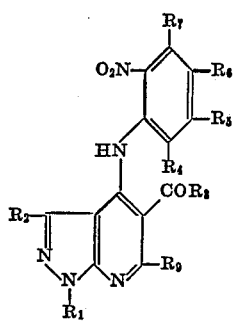

Catalytic reduction of the product of Formula VIII in the presence of a catalyst like palladium on charcoal gives a compound of the formula (IX) 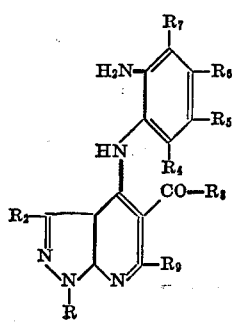

When $R_4$, $R_5$, $R_6$ and $R_7$ are all hydrogen a compound of Formula IV is directly produced by reacting o-phenylene-diamine with the product of Formula VII in the presence of potassium carbonate or triethylamine.

Compounds of Formula I with $R_3$=H are now produced by heating products of Formula IX with an acid like p-toluene-sulfonic acid, sulfuric acid, phosphoric acid or the like in an inert organic solvent like benzene, xylene, toluene or dioxane. Sometimes it is advantageous to distill off the water formed by means of a water separator.

According to a modification of the foregoing procedure, a product of Formula I wherein $R_1$ is hydrogen may be produced. According to this modification a 5-aminopyrazole of Formula II is used, wherein $R_1$ is an arylmethyl group of a heteromethyl group. This starting material has the formula (IIIa) 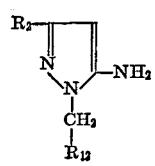

wherein $R_{12}$ is an aromatic or heterocyclic nucleus like phenyl, naphthyl, furyl, pyridyl, pyrimidyl, pyrazinyl or the like.

This material is processed as described above through the reaction with a compound of Formula III, cyclization of the product corresponding ot Formula V to obtain a compound of Formula VI.

At this point, the compound of Formula VI, having the —$CH_2$—$R_{12}$ substituent of Formula IIIa in the 1-position, is oxidized with an oxidizing agent like selenium dioxide in a high obiling solvent like dethyleneglycol dimethylether at about 160° C. Ths yields a compound of Formula VI, wherein $R_1$ is hydrogen. Subsequently, this intermediate is converted to the chlorine compound of Formula VII by means of phosphorus oxychloride which is processed as described above.

Compounds of Formula I wherein $R_3$ is other than hydrogen are produced by the reaction of materials of Formula I with an appropriately substituted alkyl halide in the presence of sodium hydride.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of Formula I may be administered orally or parenterally in a conventional dosage form such as tablet, capsule, injectable or the like. A single dose, or preferably 2 to 4 divided daily doses, provided on a basis of about 2 to 40 mg. per kilogram per day, preferably about 2 to 15 mg. per kilogram per day, is appropriate. These may be conventionally formulated in an oral or parenteral dosage form by compounding about 10 to 200 mg. per unit of dosage with conventional vehicle, excipient, binder, preservative, stabilizer, flavor or the like as called for by accepted pharmaceutical practice.

The new compounds also increase the intracellular concentration of adenosine-3′,5′-cyclic monophosphate, and thus by the administration of about 10 to 100 mg./kg./day, preferably about 10 to 50 mg./kg., in single or two to four divided doses in conventional oral or parenteral dosage forms such as those described above may be used to alleviate the symptoms of asthma.

The following examples are illustrative of the invention. All temperatures are on the centigrade scale.

EXAMPLE 1

4,10-dimethyl-1-ethyl-1H,4H-pyrazolo[3',4'-2,3]pyrido[4,5-e]b-benzo-1,5-diazepine (a) (1-ethyl-5-pyrazolo)aminomethylene acetoacetic acid ethyl ester.—222 g. of 1-ethyl-5-aminopyrazole (2 mol.) and 372 g. of ethoxymethylene acetoacetic acid ethyl ester (2 mol.) are heated together at 120–130° with stirring, until the theoretical amount of alcohol is distilled. Cooling and recrystallization from methanol yields 375 g. of (1-ethyl-5-pyrazolyl)aminomethylene acetoacetic acid ethyl ester (74%), M.P. 53–55°.

(b) 5-acetyl-1-ethyl-4-hydroxy-1H - pyrazolo[3,4 - b]pyridine.—300 g. of (1-ethyl-5-pyrazolyl)aminomethylene acetoacetic acid ethyl ester (1.2 mol.) are heated in an oil bath for 5 minutes at 260°, while the alcohol formed is distilled off. After this time, it is cooled as rapidly as possible. The residue is recrystallized from methanol and yields 148 g. of 5-acetyl-1-ethyl-4-hydroxy-1H-pyrazolo[3,4-b]pyridine (60%), M.P. 155–157°.

(c) 5-acetyl-4-ethoxy-1-ethyl-1H-pyrazolo[3,4-b]pyridine.—102 g. of 5-acetyl-1-ethyl-4-hydroxy-1H-pyrazolo[3,4-b]pyridine (0.5 mol.) are dissolved in 500 ml. of dimethylformamide. 100 g. of potassium carbonate (0.71 mol.) and 117 g. of ethyl iodide (0.75 mol.) are added. The mixture is heated for 10 hours with continuous stirring at 60–70°. The precipitate is filtered off and the liquid phase evaporated to about 100 ml. After the addition of 500 ml. of water 5-acetyl-4-ethoxy-1-ethyl-1H-pyrazolo[3,4-b]pyridine precipitates and yields on filtration 92 g. (73%), M.P. 136°.

(d) 4-[(2-aminophenyl)amino]-5-acetyl-1-ethyl - 1H-pyrazolo[3,4-b]pyridine.—23.3 g. of 5-acetyl-4-ethoxy-1-ethyl-1H-pyrazolo[3,4-b]pyridine (0.1 mol.) are dissolved in 100 ml. of dimethylformamide and refluxed for three hours wit h10.8 g. of o-phenylenediamine (0.1 mol.). The mixture is cooled to room temperature and about 50 ml. of water are added. 4-[(2-aminophenyl)amino]-5-acetyl-1-ethyl-1H - pyrazolo[3,4 - b]pyridine precipitates and is filtered off. Recrystallization from methanol yields 22 g. (75%), M.P. 195–198°.

(e) 1-ethyl-10-methyl-1H,4H-pyrazolo[3',4' - 2,3]pyrido[4,5-e]b-benzo-1,5-diazepine.—29.5 g. of 4-[(aminophenyl)amino]-5-acetyl-1-ethyl-1H-pyrazolo[3,4 - b]pyridine (0.1 mol.) are dissolved in 100 ml. of anhydrous pyridine and refluxed for 16 hours with 11.5 g. of pyridine hydrochloride. The reaction mixture is evaporated to dryness and the residue is treated with 100 ml. of water. The crude 1-ethyl-10-methyl-1H,4H-pyrazolo[3',4'-2,3]pyrido[4,5-e]b-benzo-1,5-diazepine is filtered off. Recrystallization from methanol gives 11 g. (40%), M.P. 205–208°.

(f) 4,10-dimethyl-1-ethyl-1H,4H-pyrazolo[3',4' - 2,3]pyrido[4,5-e]b-benzo-1,5-diazepine.—13.8 g. of 1-ethyl-10-methyl-1H,4H-pyrazolo[3',4' - 2,3]pyrido[4,5 - e]b-benzo-1,5-diazepine (0.05 g.) are added to a hot suspension of 2.4 g. of sodium hydride (0.1 mol.) in 100 ml. of dry diethyleneglycol dimethylether. Refluxing is continued for an additional 30 minutes. Then 14.1 g. of methyl iodide (0.1 mol.) are added and the temperature is maintained for 12 hours. Hot filtration, followed by evaporating the solvent, yields a pale yellow oil, which crystallizes on addition of a few drops of ether. Recrystallization from ethyl acetate gives 9 g. (62%) of 4,10-dimethyl-1-ethyl-1H,4H-pyrazolo[3',4' - 2,3]pyrido[4,5-e]b-benzo-1,5-diazepine, M.P. 131–133°.

EXAMPLE 2

1-ethyl-4-(3-dimethylamino)propyl-10-phenyl-1H,4H-pyrazolo[3',4'-2,3]pyrido[4,5-e]b-benzo-1,5-dizaepine (a) 5-benzoyl-1-ethyl-4-hydroxy-1H-pyrazolo[3,4 - b]pyridine.—222 g. of 5-amino-1-ethylpyrazole (2 mol.) and 496 g. of ethoxymethylenebenzoylacetic acid ethyl ester (2 mol.) are heated with stirring to about 140°, until no more alcohol distills. The temperature is then raised to 240°. The alcohol formed is distilled off in vacuo. After about one hour the reaction is finished, the residue is cooled to room temperature and 500 ml. of methanol are added. 5-benzoyl-1-ethyl-4-hydroxy-1H-pyrazolo[3,4-b]pyridine crystallizes and is filtered off. Yield 360 g. (67%), M.P. 151°.

(b) 5-benzoyl - 4 - chloro-1-ethyl-1H-pyrazolo[3,4-b]pyridine.—53.5 g. of 5-benzoyl-1-ethyl - 4 - hydroxy-1H-pyrazolo[3,4-b]pyridine (0.2 mol.) and 150 ml. of phosphorus oxychloride are refluxed at 150° C. for five hours. The excess phosphorus halide is removed in vacuo and the residue neutralized with saturated sodium bicarbonate solution. The pale yellow crystals of 5-benzoyl-4-chloro-1-ethyl-1H-pyrazolo[3,4-b]pyridine are filtered off and recrystallized from ethyl acetate, yield 35 g. (61%), M.P. 140°.

(c) 4-[(2 - aminophenyl)amino]-5-benzoyl - 1 - ethyl-1H-pyrazolo[3,4-b]pyridine.—57 g. of 5-benzoyl-4-chloro-1-ethyl-1H-pyrazolo[3,4-b]pyridine (0.2 mol.), 21.6 g. of o-phenylenediamine (0.2 mol.), 30.3 g. of triethylamine (0.3 mol.) and 500 ml. of diethyleneglycol dimethylether are refluxed for five hours. After this time, the mixture is cooled and the precipitated triethylammonium chloride is filtered off and approximately 200 ml. of water are added to the filtrate. 4-[(2-aminophenyl)amino]-5-benzoyl-1-ethyl-1H - pyrazolo[3,4-b]pyridine crystallizes on standing. Yield 56 g. (78%), M.P. 155–158°.

(d) 1 - ethyl-10-phenyl-1H,4H-pyrazolo[3',4'-2,3]pyrido[4,5-e]b-benzo-1,5-diazepine.—7.1 g. of 4-[(2-aminophenyl)amino]-5 - benzoyl - 1 - ethyl-1H-pyrazolo[3,4-b]pyridine (0.02 mol.) are suspended in 100 ml. of benzene, 0.5 g. of p-toluene sulfonic acid are added and the mixture is refluxed for 12 hours while distilling off the water formed, using a water separator. The solvent is distilled off and the residue, 1-ethyl-10-phenyl-1H,4H-pyrazolo[3',4'-2,3]pyrido[4,5-e]b-benzo-1,5-diazepine, is recrystallized from methanol, yield 6 g. (88%), M.P. 249–251°.

(e) 1-ethyl-4-(3 - dimethylamino)propyl - 10 - phenyl-1H,4H-pyrazolo[3',4'-2,3]pyrido[4,5-e]b-benzo - 1,5 - diazepine.—6.8 g. of 1-ethyl - 10 - phenyl-1H,4H-pyrazolo[3',4'-2,3]pyrido[4,5-e]b-benzo-1,5-diazepine (0.02 mol.) are added to a refluxing suspension of 0.72 g. of sodium hydride (0.03 mol.) in 50 ml. of anhydrous dioxane. The mixture is heated for 30 minutes. Then 3 g. of 3-dimethylaminopropyl chloride (0.025 mol.) are added and refluxing is continued for an additional seven hours. The mixture is filtered hot and the filtrate evaporated to dryness. The light yellow oily residue of 1-ethyl-4-(3-dimethylamino)propyl - 10 - phenyl-1H,4H-pyrazolo[3',4'-2,3]pyrido[4,5-e]b-benzo - 1,5 - diazepine is crystallized with petroleum ether. Yield 5.5 g. (65%), M.P. 104–105°.

EXAMPLE 3

1-ethyl-4-methyl-10-phenyl-1H,4H-pyrazolo[3',4'-2,3]pyrido[4,5-e]b-benzo-1,5-diazepine By substituting the product of Example 2(d) in the procedure of Example 1(f), 1-ethyl-4-methyl-10-phenyl-1H,4H-pyrazolo[3',4'-2,3]pyrido[4,5-e]b-benzo - 1,5 - diazepine is obtained, M.P. 188–190°.

EXAMPLE 4

1,4-diethyl-10-phenyl-1H,4H-pyrazolo[3',4'-2,3]pyrido[4,5-e]b-benzo-1,5-diazepine By substituting the product of Example 2(d) and utilizing ethyl iodide instead of methyl iodide in the procedure of Example 1(f), 1,4-diethyl-10-phenyl-1H,4H-pyrazolo[3',4'-2,3]pyrido[4,5-e]b-benzo-1,5-diazepine is obtained, M.P. 120–123°.

The following additional compounds are produced by the procedure of Example 1:

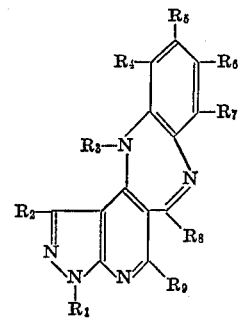

| Ex. | R₁ | R₂ | R₃ | R₄ | R₅ | R₆ | R₇ | R₈ | R₉ |
|---|---|---|---|---|---|---|---|---|---|
| 5 | C₂H₅ | H | CH₃ | H | Cl | Cl | H | phenyl | CH₃ |
| 6 | C₂H₅ | CH₃ | CH₃ | CH₃ | H | H | H | −CH₂−C₆H₅ | H |
| 7 | H | CH₃ | H | H | H | OCH₃ | H | −CH₂CH₂−C₆H₅ | H |
| 8 | C₆H₅−CH₂CH₂− | H | C₂H₅ | H | H | H | Br | C₂H₅ | phenyl |
| 9 | cyclobutyl | H | C₂H₅ | CH₃ | H | H | CH₃ | phenyl | H |
| 10 | C₂H₅ | CH₃ | −CH₂−C₆H₅ | H | C₂H₅ | H | H | Same as above | H |
| 11 | CH₃ | H | 2-thienyl | H | H | CH₃ | H | do | H |
| 12 | C₂H₅ | CH₃ | CH₃ | CH₃ | CH₃ | CH₃ | CH₃ | CH₃ | CH₃ |
| 13 | C₂H₅ | CH₃ | 2-thiopyranyl | H | H | CH₃ | H | phenyl | H |
| 14 | C₂H₅ | H | −CH₂CH₂−C₆H₅ | H | H | H | H | CH₃ | H |
| 15 | CH₃ | phenyl | CH₃ | H | Cl | H | H | phenyl | CH₃ |
| 16 | phenyl | H | H | H | H | Cl | H | Same as above | H |
| 17 | 2-thiopyranyl | CH₃ | 2-thiopyranyl | H | H | H | H | CH₃ | H |
| 18 | C₂H₅ | CH₃ | −CH₂CH₂N(CH₃)₂ | H | Br | H | H | C₂H₅ | C₂H₅ |
| 19 | C₂H₅ | H | −CH₂CH₂N(C₂H₅)₂ | H | Cl | H | H | CH₃ | H |
| 20 | C₂H₅ | CH₃ | −(CH₂)₃NHCH₂CH₂OH | H | H | H | H | CH₃ | H |
| 21 | H | CH₃ | −CHCH₂NH₂ | H | H | CH₃ | H | CH₃ | CH₃ |
| 22 | C₂H₅ | H | −CH₂CH₂N(morpholino) | H | H | H | H | phenyl | H |
| 23 | C₂H₅ | H | CH₂N(N-methylpiperazino) | H | H | H | H | CH₃ | H |
| 24 | C₂H₅ | CH₃ | CH₂N(thiomorpholino) | H | H | H | H | CH₃ | H |
| 25 | CH₃ | H | −CH₂N(N'-hydroxyethylpiperazino) | H | H | H | H | phenyl | H |
| 26 | C₂H₅ | H | (CH₂)₃N(2-ethoxypyrrolidino) | H | H | H | H | Same as above | H |
| 27 | H | H | CH₂N(methylthiomorpholino) | H | CH₃ | H | CH₃ | CH₃ | CH₃ |
| 28 | C₂H₅ | CH₃ | −(CH₂)₃N(piperidino) | H | H | H | H | phenyl | H |

What is claimed is:
1. A compound of the formula

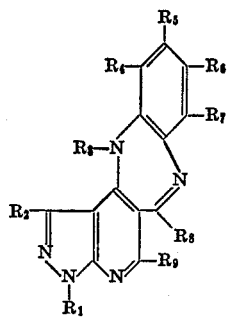

wherein $R_1$ is hydrogen, lower alkyl, phenyl, phenyl-lower alkyl or cyclo-lower alkyl; $R_2$ and $R_9$ each is hydrogen, lower alkyl or phenyl; $R_3$ is hydrogen, lower alkyl, phenyl-lower alkyl, cyclo-lower alkyl or the group

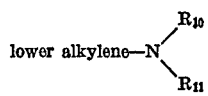

wherein $R_{10}$ and $R_{11}$ each is hydrogen, lower alkyl, hydroxy-lower alkyl or the

radical together forms the heterocyclic pyrrolidino, piperidino, morpholino, thiamorpholino or the lower alkyl, lower alkoxy or hydroxy-lower alkyl substituted heterocyclic; $R_4$, $R_5$, $R_6$ and $R_7$ each is hydrogen, halogen, lower alkyl or lower alkoxy; and $R_8$ is lower alkyl, phenyl or phenyl-lower alkyl.

2. A compound as in claim 1 wherein $R_2$, $R_4$, $R_5$, $R_6$, $R_7$ and $R_9$ each is hydrogen.

3. A compound as in claim 1 wherein $R_1$ is hydrogen or lower alkyl, $R_2$ is hydrogen or methyl, $R_3$ and $R_9$ each is hydrogen or lower alkyl, $R_4$, $R_5$, $R_6$ and $R_7$ each is hydrogen, halogen or lower alkoxy and $R_8$ is lower alkyl or phenyl.

4. A compound as in claim 1 wherein $R_1$ is lower alkyl, $R_8$ is phenyl and $R_2$, $R_3$, $R_4$, $R_5$, $R_6$, $R_7$ and $R_9$ each is hydrogen.

5. A compound as in claim 4 wherein the lower alkyl group is ethyl.

6. A compound as in claim 1 wherein $R_1$ and $R_8$ each is lower alkyl and $R_2$, $R_3$, $R_4$, $R_5$, $R_6$, $R_7$ and $R_9$ each is hydrogen.

7. A compound as in claim 6 wherein $R_1$ is ethyl and $R_8$ is methyl.

8. A compound as in claim 1 wherein $R_1$ is lower alkyl, $R_3$ is di(lower alkyl)amino-lower alkylene, $R_8$ is phenyl and $R_2$, $R_4$, $R_5$, $R_6$, $R_7$ and $R_9$ each is hydrogen.

9. A compound as in claim 8 wherein $R_1$ is ethyl and $R_3$ is dimethylaminopropyl.

10. A compound as in claim 1 wherein $R_1$ and $R_3$ each is lower alkyl, $R_8$ is phenyl and $R_2$, $R_4$, $R_5$, $R_6$, $R_7$ and $R_9$ each is hydrogen.

11. A compound as in claim 10 wherein $R_1$ and $R_3$ each is ethyl.

12. A compound as in claim 10 wherein $R_1$ is ethyl and $R_3$ is methyl.

References Cited
UNITED STATES PATENTS
3,250,769   5/1966   Schmidt et al. _____ 260—247.1

HENRY R. JILES, Primary Examiner

C. M. S. JAISLE, Assistant Examiner

U.S. Cl. X.R.

260—240 R, 243 B, 247.5 R, 250 R, 256.4 N, 293.6, 296 H, 296 R, 310 R, 268 PC; 424—246, 248, 263, 267, 250